Patented Oct. 4, 1932

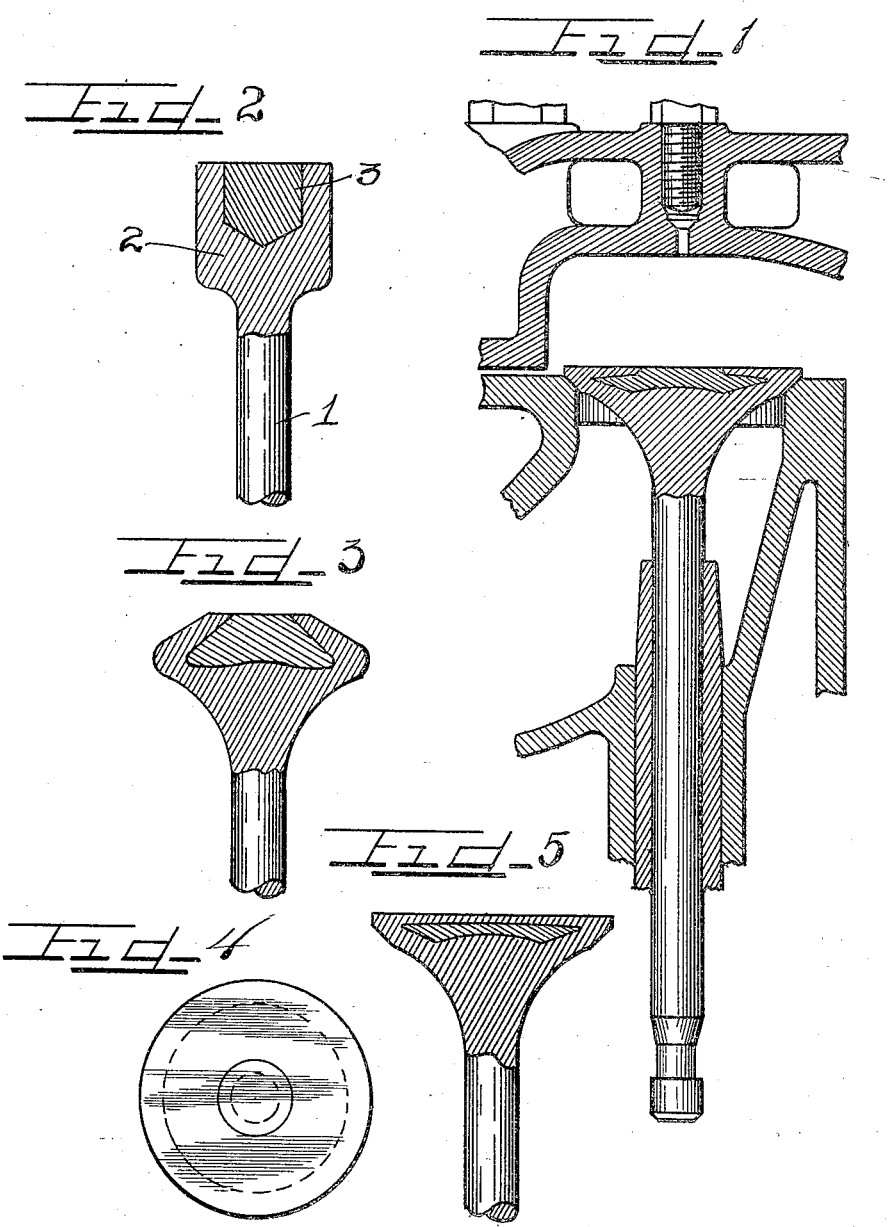

1,880,704

UNITED STATES PATENT OFFICE

RICHARD E. BISSELL, OF CLEVELAND HEIGHTS, OHIO, ASSIGNOR TO THOMPSON PRODUCTS INC., OF CLEVELAND, OHIO, A CORPORATION OF OHIO

PROCESS OF MAKING VALVES

Original application filed August 2, 1926, Serial No. 126,355. Patent No. 1,775,845. Divided and this application filed January 26, 1929. Serial No. 335,198.

The invention relates to poppet valves and to a process of making same, of the type commonly employed in internal combustion engines.

This invention constitutes divisional subject matter from my copending patent application, Serial No. 126,355, filed August 2, 1926.

The object of the invention is to provide a valve head having an insert of material of different characteristics from that of the main body of the head, and to make the same in an economical way.

This invention consists in the process hereinafter described and claimed.

In the drawing:

Figure 1 is a vertical section through a valve made in accordance with my invention, showing parts of the engine structure associated therewith;

Figure 2 is a blank from which the valve head is formed, ready for the upsetting operation;

Figure 3 illustrates the shape assumed by the blank after the first upsetting operation;

Figure 4 is a plan view of the valve head as shown in Fig. 1; and

Figure 5 is a vertical section through the head of a modified form of valve in which the insert is entirely enclosed by the body of the valve head.

Referring to the drawing in detail, in which the same reference number is used throughout to designate the same part, a metal rod 1 is provided with a thickened upper end 2 in which is formed a recess 3. This recess is filled, or partially filled, with a material having characteristics different from the material of the rod 1. Preferably the rod 1 will be of non-hardened steel, capable of being worked. The material selected for the insert will depend upon the function it is to perform in the completed valve. It might be desired to make a valve with an insert of high heat conductivity for the purpose of equalizing the temperature throughout the valve head; or one having an insert of greater coefficient of expansion whereby to lift the head on its seat sufficiently to compensate for an increased length of the stem, as the temperature of the parts increase in operation, or one having an insert of different frequency of vibration than the main body, for the purpose of deadening the sound resulting from the seating of the valve; or one having an insert of still different characteristics for some other purpose. Insofar as I know, an insert of metal in a valve head having characteristics different from the main body of the head is novel and I claim it broadly, as well as the process disclosed of producing a head with such an insert. But specifically the invention relates to an insert designed to reduce vibration of the valve head resulting from engagement with its seat at high velocity. To reduce vibration, many different materials may be used, the material to be selected being dependent partly upon its own characteristics and partly upon the material employed for the main body of the head. Preferably it should be soft and non-oxidizing, and with a frequency of vibration differing from the remainder of the head. At the present time, I consider invar as one of the best materials for the insert where the remainder of the head is of silicon-chromium steel. But if invar were used for the main body of the head a non-ferrous metal would serve well for the insert.

Having filled the recess 3 with material such as above described, the end of the rod is subjected to an upsetting operation, well known to those skilled in the art. Preferably dies will be selected such that after the first operation the head will have the appearance indicated in Fig. 3. The blank is then subjected to a second upsetting operation to form the head as shown in Fig. 1.

While it is considered preferable to have the recess containing the insert open from the upper face of the head, the inserted material might be entirely surrounded by the main body of the head. To fabricate such an article, it would only be necessary to partially fill the recess 3, leaving a space at the top, whereby in the subsequent upsetting operation, the material of the main body of the valve would be pressed entirely around the material of the insert.

It is well known that the closing of the valves of an internal combustion engine on their seats at high velocity causes considerable noise, which is due to the ringing qualities of the valve head. An insert such as described above acts materially to reduce this vibration not only because of the character of the material selected for the insert but because the junction between the materials of the insert and main body is such as will not freely transmit the vibration initiated at the margin of the valve, as would be the case were the head homogeneous; in other words, the different materials are in adhering contact, in most embodiments, as distinguished from the intimate union resulting from cohesion, such as occurs in welding. The result is such as that commonly observed in a cracked bell.

It is apparent that the materials of the main body of the valve head and of the insert may be widely varied, depending upon the functions which it is desired the valve shall perform, and that the process of making a valve head with an insert such as disclosed may be carried out in other ways. It is therefore to be understood that the disclosure herein is merely exemplary of the principles underlying my invention, and that it is not confined to the specific article or mode of construction disclosed, but that it includes all changes and modifications falling within the terms of the appended claims.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The process of making an article of manufacture comprising a headed member from a stem having an enlarged end which consists in providing said enlarged end with an insert having characteristics different from that of said end and contemporaneously forming said end into a head and interlocking said insert with said head in such a manner as to dispose it wholly within the head.

2. The process of making a headed member including a head and stem which consists in providing one end of the stem with an insert and contemporaneously forming said end into a head, flattening said insert so as to provide it with a lateral portion extending toward the peripheral edge of the head and surrounding said lateral portion with the material of the head so as to interlock said insert with said head.

3. The process of making a valve which consists in providing one end of the stem with an insert of relatively soft metal and contemporaneously forming said end into a head, flattening said insert so as to provide it with a lateral portion extending toward the peripheral edge of the valve and surrounding said lateral portion with the material of the head so as to interlock said insert with said head.

4. The method of fabricating a composite metal article which comprises providing a blank of one metal with a cylindrical cavity at one end thereof, inserting into such cavity an insert of another metal, and thereafter simultaneously forging the portion of said blank containing said insert and the contained insert.

5. The method of fabricating a composite metal article which comprises providing a blank of one metal with a cylindrical cavity at one end thereof, inserting into such cavity an insert of another metal, and thereafter simultaneously forging the portion of said blank containing said insert, and the contained insert so as to form a head on said blank and to leave exposed a portion of said insert.

6. The method of fabricating a composite metal article which comprises providing a blank of one metal with a cylindrical cavity at one end thereof, inserting into such cavity an insert of another metal, and thereafter simultaneously forging the portion of said blank containing said insert and the contained insert so as to provide said portion of said blank with a head having an inturned lip overhanging an exposed portion of said insert.

In testimony whereof I have hereunto subscribed my name at Cleveland, Cuyahoga County, Ohio.

RICHARD E. BISSELL.